United States Patent Office 3,453,347
Patented July 1, 1969

3,453,347
BLENDS OF POSTCHLORINATED VINYL CHLORIDE RESIN AND A POSTCHLORINATED LINEAR POLYETHYLENE CONTAINING A SMALL AMOUNT OF A RUBBERY, AMORPHOUS POLYEPOXIDE
Patricia M. Dreyfuss, Akron, and Harold A. Tucker, Cleveland, Ohio, assignors to The B. F. Goodrich Company, New York, N.Y., a corporation of New York
No Drawing. Filed Jan. 2, 1968, Ser. No. 694,814
Int. Cl. C08f 29/24, 29/20
U.S. Cl. 260—897                                6 Claims

ABSTRACT OF THE DISCLOSURE

Blends of from about 90 to about 95 parts/wt. of a postchlorinated vinyl chloride resin and from about 5 to about 10 parts/wt. of a rubbery, postchlorinated linear polyethylene are significantly improved by the further addition of from about 0.25 to about 2.5 parts/wt. of an amorphous rubber derived from a substituted alkylene monoepoxide. The melt flow characteristics, impact resistance, and stability of the resulting blend are significantly improved by the polyepoxide. The blends are useful as rigid, structural thermoplastics in the form of pipe, tubing, pipe fittings, sheets, plates, etc.

BACKGROUND OF INVENTION

Postchlorinated vinyl chloride resins (hereinafter referred to by the abbreviation "PCPVC") such as postchlorinated polyvinyl chloride, prepared by the actinically-activated post-chlorination of the resin at low temperatures in aqueous suspension containing a chloromethane swelling agent such as chloroform, are excellent thermoplastics useful at service temperatures of 90° to 110° C. or more. Such materials, which are to be distinguished from the older, more soluble unstable types of chlorinated polyvinyl chloride such as are employed in fibers and in lacquers and coating resin applications, are extremely stable, low in solubility and have high resistance to distortion by heat. PCPVC of this type, however, are brittle and difficult to process.

Most of the processing aids and rubbery impact-improving additives employed in non-chlorinated vinyl resins such as polyvinyl chloride are not effective in improving the processing behavior or impact resistance of PCPVC. Known formulations of the latter require further improvement in processing behavior, particularly in their flow properties.

PRIOR ART

U.S. Patent 3,299,182 discloses a commercially-important impact-resistant blend of a PCPVC with a rubrey, postchlorinated polyethylene (hereinafter referred to by the abbreviation "PCPE") additive. Such blends are extruded in the form of pipe and tubing having reliably high burst strength and low creep at household hot water temperatures (150 to 200° F.). While these prior art blends are excellent impact-resistant and rigid thermoplastics well-suited to processing by extrusion, their processing in newer equipment involving high speed, high shear and high temperatures (as, for example, in high speed injection molding) has been difficult and their impact strength when so processed is not as high as may be required for more stringent applications.

It is known that epoxy type materials may be added to thermoplastic vinyl resins such as polyvinyl chloride. For example, U.S. Patent 2,718,509 shows the use of substantial proportions of polyoxyhydrocarbon glycols as plasticizers or softening agents in vinyl chloride resins. Similarly, U.S. Patent 2,718,509 discloses the use of from about 10% to about 70%/wt. based on the resin of low molecular weight forms of polymerized alkylene oxides such as ethylene oxide and propylene oxide as plasticizers in thermosetting and thermoplastic resins such as polystyrene. As with other plasticizers, these epoxy type plasticizers seriously degrade the heat distortion characteristics of the resin.

SUMMARY OF THE INVENTION

The present invention relates to thermoplastic, resinous blends having high impact resistance and heat distortion characteristics suitable for elevated temperature service at 90° to 110° C. or higher. Such blends of this invention contain, as the three essential polymeric constituents, (1) as the base resin, 100 parts/wt., of a PCPVC, as defined below, (2) from about 5 to about 10 parts/wt. of a rubbery PCPE, also as defined below, and (3) from about 0.25 to about 2.5 parts/wt. of a rubbery, amorphous (branch-chained) polymerized alkylene mono-epoxide, also as more fully defined below. The inclusion of such a small proportion of a particular type of polyepoxide very significantly improves the melt flow characteristics of the blend and imparts somewhat higher impact resistance and stability, all without significant effects on the normally excellent heat distortion characteristics and chemical and solvent resistance of the two-component PCPVC/PCPE blends of the prior art. The fact that an additive, and particularly an epoxy type additive, can improve flow properties of a resinous formulation without degrading the heat distortion characteristics is most surprising.

DETAILED DESCRIPTION

We have discovered that only the amorphous rubbery polymerized epoxides derived by the polymerization of monomeric alkylene monoepoxides (oxiranes) containing an epoxy group attached to alkylene hydrocarbon group containing at least three consecutively-connected carbon atoms, have the above-described beneficial effect on PCPVC/PCPE blends. Monomeric epoxides of this type polymerize by opening of the oxirane ring with the result that the polymer chain possesses dangling hydrocarbon radicals or side-chains. For example butene-1 oxide polymerizes forming a structure that may be represented

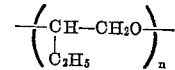

In contrast, tetrahydrofuran has the same empirical formula as butene-1 oxide and polymerizes by opening of the ring but produces a polymer having a linear structure which may be represented as

The latter polymer is highly crystalline whereas the empirically similar, branched-chain poly-butene-1 oxide and other similar poly-epoxides of this invention are permanently rubbery, amorphous materials.

The crystalline poly-tetrahydrofuran ("PTHF") type of polyepoxide and the permanently rubbery, amorphous polyepoxides of the instant invention are an interesting contrast in their effects on admixture with PCPVC materials. In small proportions (i.e. 0.25–2.5%/wt. on such resin) the crystalline PTHF type of material is without practical value in PCPVC/PCPE blends. When, however, increased propertions in the range above about 5%/wt. of the PTHF type of materials are blended with a rapid increase in impact resistance is noted. The use of PTHF in this fashion in vinyl chloride resins is the subject of the copending application of Patricia M. Dreyfuss and M. Peter Dreyfuss, Ser. No. 694,743, and in PVPVC type resins, is the subject of the copending sole application of Patricia M. Dreyfuss, Ser. No. 694,862, both of even date herewith.

In contrast, as indicated above, the amorphous, branched-chain polyepoxides of this invention are highly effective at low proportions in PCPVC/PCPE blends with the main effects being an increase in both melt flow rate and impact strength. When the proportion of the rubbery type polyepoxide in such blends is above about 3%/wt. or more based on the PCPVC base resin, the impact resistance, rigidity and heat distortion characteristics of the formulation is rapidly degraded and large increases in melt flow are observed. Thus, the amorphous polyepoxide of this invention in small proportions is a processing aid whereas the crystalline type such as PTHF in larger proportions is a primary impact improving additive useful as a replacement for PCPE.

To have the described effect, the amorphous, rubbery polyepoxide should have a sufficiently high molecular weight to be rubbery i.e. equivalent to that evidenced by dilute solution viscosity ("DSV") of at least 2.0 dl./gm. as determined at 25° C. at a concentration of 0.1 gram in 100 ml. of toluene.

Postchlorinated vinyl chloride resin

A PCPVC material useful as the base resin in the blends of this invention is best characterized in terms both of the parent vinyl chloride resin from which it is derived and of the final postchlorinated product itself. Vinyl chloride resins suitable as parent resins must be high quality resins produced by the polymerization of monomeric materials consisting of mono-vinylidene compounds (i.e. monomeric materials containing a single vinylidene $CH_2=C<$ group per molecule) containing not less than about 95%/wt. of vinyl chloride and not more than about 5%/wt. of one or more other mono-vinylidene monomers such as vinylidene chloride, vinyl bromide, vinyl fluoride, vinyl acetate, methyl acrylate, methyl methacrylate, acrylonitrile, ethylene, propylene, n-butene, and others. Polyvinyl chloride of high quality is much preferred.

The parent vinyl chloride resin for use in postchlorination should be a high quality material of high stability, it should be coarsely granular (i.e. made up of granules above 10 microns in diameter and up to about 200 microns in diameter), it should be more or less porous by reason of possessing from about 5% to about 50%/vol. or more of pore space, and have a moderate-to-high molecular weight as evidenced by an inherent viscosity, according to ASTM D-1243, as measured using 0.2 gram of resin in 100 ml. of cyclohexanone at 30° C., of at least 0.40 dl./gm. more preferably at least about 0.45, and most preferably above about 0.55, and up to about 1.45 dl./gm. By "high stability" in a parent resin is meant a material which, in the virgin state, will show no visible degradation on heating in air at 375° F. for 5 to 10 minutes or more.

Post-chlorination is preferably carried out by the method shown in U.S. Patent No. 2,996,489, namely, chlorination of the granular, porous parent resin at low temperatures in aqueous suspension in the presence of (1) actinic radiation as an activator, in the presence of (2) a hydrochloromethane compound as a swelling agent such as monochloromethane, dichloromethane and trichloromethane (chloroform), in the presence of (3) an excess of dissolved chlorine, and (4) at a temperature not higher than about 65° C. PCPVC materials made in this manner in the presence of chloroform have considerably greater high temperature stability than those made with no swelling agent and better than those made with any other swelling agent.

The PCPVC materials thus produced are characterized by lowered solubility in lacquer-type solvents and by a stability in the virgin state sufficient to survice heating in air at 375° F. for at least 10 minutes (i.e. as stable, or more stable than its parent). Such PCPVC materials should have a specific gravity at 23° C., (according to ASTM D-792), of from about 1.52 to about 1.62 grams/cc. Specific gravity in these PCPVC materials is a direct indication of the chlorine content, the above specific gravity range corresponds to chlorine contents ranging from about 63.5% to about 69%/wt. Such PCPVC materials also possess an HDT according to ASTM D-648 at 264 p.s.i. of from about 95° to about 125° C. (a range which usually is at least 20° C. higher than the corresponding values for the parent vinyl chloride resin) and a notched Izod impact strength of up to about 0.3 to about 0.5 ft. lbs./in. of notch (according to ASTM D-256 at 264 p.s.i.). The density and HDT values recited are the main distinguishing features of the PCPVC materials useful in the blends of this invention.

Chlorinated polyethylene

The postchlorinated polyethylene (PCPE) ingredient for use in the blends of this invention is a rubbery material resulting from the homogeneous chlorination of a macromolecular polyethylene having a substantially linear structure low in branching [i.e. less than about 3, and more preferably less than about 0.03 methyl (sidechain) groups per 100 methylene groups in the polymer molecule]; a density (ASTM D-1505-57T) of from about 0.926 to about 0.965 gram/cc. at 25° C., more preferably 0.941 to 0.965 gram/cc.; a melting point usually in the range of from about 125° to 130° C.; and a melt index (according to ASTM D-1238-57T) in the range above about 0.05, more preferably in the range from about 0.05 to about 7. A good method of preparing such a PCPE material is more fully described in U.S. Patent 3,299,182. Briefly, the method of the latter patent involves combining the polyethylene with a relatively large volume of carbon tetrachloride, containing a trace of a peroxide in a closed, agitator-equipped reactor and then introducing gaseous chlorine while cooling to keep the temperature at or below about 125° C. There results a solution of rubbery chlorinated polyethylene which is water washed and then added to an excess of methanol to precipitate the solid rubbery product which is then dried. PCPE materials made in this fashion and containing from about 5% to about 50%/wt. of combined chlorine, more preferably from about 30% to about 40%/wt. of combined chlorine, are effective in the blends of this invention.

Preparation of polyepoxide

The polyepoxide additives for use in the blends of this invention are produced by the polymerization of a monomeric material consisting of one or more alkylene monooxides or monoepoxides (oxiranes) containing a single epoxy group attached to a hydrocarbon group containing at least 3, and preferably from 3 to about 8, consecutively-connected carbon atoms (connected by direct carbon-to-carbon bonds). Such epoxides have the general formula $O—CH_2—CH(CH_2)_nCH_3$ where $n$ is an integer from 1 to 6. Epoxides of this class include propylene oxide, butene-1 oxide, pentene-1 oxide, hexane-1 oxide, heptene-1 oxide, octene-1 oxide, and others. More preferred are epoxides of this class where $n$ in the above formula is from 0 to 3. Most preferred is butene-1 oxide.

The epoxides defined above may be polymerized in any manner capable of producing a polymer of at least moderate molecular weight, as indicated above. A particularly effective method is a polymerization employing a metal alkyl catalyst, for example, a hydrocarbyl aluminum or chelated hydrocarbyl aluminum/water reaction product. If desired, small proportions (i.e. up to about 50% by volume) of an inert organic diluent may be employed in such a polymerization including saturated aliphatic hydrocarbons such as hexane, heptane and cyclohexane, aromatic hydrocarbons such as benzene and toluene, the lower-boiling chlorinated hydrocarbons such as chloroform, ethers such as diethyl ether, and others.

Various versions of the complexed hydrocarbyl aluminum catalysts useful in preparing the polyepoxides ingredient of the blends of this invention are disclosed in U.S. Patents 3,219,591 and 3,280,045. Such catalysts are prepared by reacting (1) a hydrocarbyl aluminum (i.e. an organoaluminum compound containing at least one hydrocarbon group connected to aluminum by a direct or primary carbon-to-aluminum bond) with (2) water in proportion of from about 0.1 to about 1.5 mole per mole of hydrocarbyl aluminum, and preferably between about 0.2 and about 1.0 mole of water per mole of hydrocarbyl aluminum and (3) a chelating agent as defined below, in a proportion of from about 0.1 to about 1.5, more preferably from about 0.5 to about 1.2, moles of chelating agent per mole of hydrocarbyl aluminum. In such catalysts, the final reaction product should, for best results, contain at least some residual direct or primary aluminum-carbon bonds.

Hydrocarbyl aluminum compounds which may be employed in the production of this catalyst have the general formula $RAlX_2$ wherein R is a hydrocarbon group such as alkyl, cycloalkyl, aryl, aralkyl and alkaryl groups linked to the aluminum through a primary aluminum-carbon bond and X may be an R-group; hydrogen; halogen such as chlorine, bromine or fluorine; alkoxy such as methoxy, ethoxy, isopropoxy, butoxy, isobutoxy, etc.; carbalkoxy

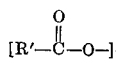

such as acetoxy, stearoxy, benzoxy, etc.; a group derived by reaction of the hydrocarbyl aluminum with a polyol such as ethylene glycol, propylene glycol, glycerin, pentaerythritol, sorbitol, catechol, resorcinol, etc.; and others.

In place of the above hydrocarbyl aluminum compounds there may be utilized a complexed form of such compound such as, for example, the coordination complex of diethyl ether or tetrahydrofuran with the hydrocarbyl aluminum. In a similar way, other coordination complexes or chelates may be formed by reacting a hydrocarbyl aluminum with an organic compound capable of forming a ring by coordination of its unshared electrons with the aluminum atom. In general such chelating agents are characterized by two functional groups, one of which is an —OH group or —SH group such as a hydroxyl, an enol of a ketone, sulfoxides or sulfone, or an —OH of a carboxyl group, and others, which —OH or —SH group reacts with the hydrocarbyl aluminum to form a conventional, primary or covalent aluminum-oxygen or aluminum-sulfur bond. The second functional groups is one which contains an oxygen, nitrogen or sulfur atom which forms a coordinate valence bond with the aluminum atom of the hydrocarbyl aluminum. Examples of the latter type of group are carbonyl, ester, carboxyl, sulfoxide, sulfone, nitroso, nitro, amino, thiocarbonyl, thiocarboxylic, thioester, and other similar groups.

Chelating agents that may be employed in the production of the catalysts described are diketones such as acetylacetone, trifluoroacetyl acetone, acetonylacetone, benzolacetone, furoylacetone, dibenzoyl methane, 3-methyl-2, 4-pentane-dione, 3-benzyl-2, 4-pentane-dione, etc.; ketoacids such as acetoacetic acid; ketoesters such as ethyl acetoacetate; ketoaldehydes such as formylacetone; hydroxy-ketones such as hydroxyethyl methyl ketone, hydroxyacetone, o-hydroxyacetophenone, 2,5-dihydroxy-p-benzoquinone, etc.; hydroxy-aldehydes such as salicylaldehyde, etc., hydroxy esters such as ethyl glycollate, 2-hydroxyethyl acetate, and others; dicarboxylic acids and their esters such as oxalic acid, malonic acid, and others; monoesters of oxalic acid, mono- and diesters of malonic acid, and others; dialdehydes such as malonaldehyde and others; alkoxy-acids such as ethoxyacetic acid and others; ketoxines such as 2,3-butane-dione-monoxine and others; dialdehyde monooximes such as glyoxal monooxime and others; hydroxyamic acids such as N-phenyl-benzohydroxamic acid and others; dioximes such as dimethyl glyoxime and others; nitro compounds such as 1,3-nitroalcohols, 1,3-nitroketones, 2-nitroacetic acid, and others; nitroso compounds such as 1,2-nitroso-oximes, and others. Chelating agents with two or more chelating functions may also be employed such as 2,5-dihydroxy-p-benzoquinone, bis(1,3-diketones) such as $(CH_3CO)_2CHCH(COCH_3)_2$ or $(CH_3CO)_2CH(CH_2)_nCH(COCH_3)_2$ where $n$ is 2, 6, or 10, bis(1,2-diketoximes), bis(1,2-dioximes), and other. A preferred chelating agent is acetylacetone.

The proportion of chelating agent combined with the hydrocarbyl aluminum compound in such complexes may vary anywhere from about 0.1 mole to about 1.5 moles per mole of aluminum, with from about 0.5 to 1.2 moles per mole of aluminum being preferred.

Such catalysts can be prepared in advance and added to the polymerization mixture or prepared in situ in the polymerization mixture. Any order of mixing may be employed, although a safer procedure may be to dilute the hydrocarbyl aluminum with solvent and/or the monomeric epoxide and then add the water and/or chelating or complexing agent, also preferably in suitably diluted form, and with a slow initial and higher final rates of addition to allow for dissipation of the sometimes rather considerable heat of reaction. Such catalyst preparation is desirably carried out with dry diluents and or monomeric epoxides and under a dry, inert atmosphere such as nitrogen so as to avoid the uncontrolled admittance of atmospheric oxygen and moisture which can lead to variable catalytic activity. The resulting catalyst is usually obtained as a clear solution which permits accurate catalyst concentration control.

Still other catalysts may be employed although few have any significant advantages over those described above. For example, there may be utilized zinc alkyls reacted with water.

The polymerization of the monomeric epoxides with these catalysts may be carried out at any temperature in the range of from about —30° C. to about 150° C., with the range of from about 0° to about 100° C. being preferred. The process may be carried out at any reasonable pressure up to superatmospheric pressures of several hundred pounds per sq. in. Polymerization in a closed system under an inert atmosphere under autogenous pressure is a satisfactory procedure. In some cases, it may be desirable from time to time during both the catalyst forming reaction and the polymerization reaction to vent the reaction mixture to the atmosphere to discharge inerts generated by decomposition of or interaction of the catalyst with the materials and impurities of the reaction mixture.

Following polymerization, the reaction mixture, which is quite viscous at conversions above about 25%, is worked up so as to obtain a solid rubbery polyepoxide free of catalyst and residual monomer. This may be accomplished by adding a solution of a short-stop (catalyst killer) such as a substituted-phenol antioxidant dissolved in methanol, in monomer or in tetrahydrofuran or in acetone. Due to the viscosity of the mix such short-stop solution may have to be worked in by mechanical mixing. The short-stopped solution is then "coagulated" or precipitated by introducing the viscous material with vigorous mixing into a considerable quantity of a non-solvent liquid, for example a 50/50 (by vol.) mixture of water and methanol. The resulting precipitate can be washed or extratced with several additional portions of 50/50 aqueous methanol and then dried, preferably in an air or vacuum oven at temperatures below about 100° C., more preferably at about 50° C. The dried product is a light-colored rubbery material of low ash content suitable for use in the blends of this invention.

Blend composition

As indicated, the blends of this invention contain, for every 100 parts/wt. of a PCPVC base resin, (1) from about 5 to about 10 parts/wt. of a PCPE impact improver, and (2) from about 0.25 to about 2.5 parts by weight of a rubbery amorphous polyepoxide. The more preferred blends will contain, for every 100 parts/wt. of PCPVC base resin, from about 7 to about 9 parts/wt. of the PCPE impact improver and from about 0.5 to about 2.0 parts/wt. of the polyepoxide. It is to be understood that one should not expect good processing if the minimum proportion in the above broad range of both the PCPE and polyepoxide additives is employed. Stated another way, the blends of this composition will contain from about 88.9 to about 95%/wt. of the PCPVC base resin, from about 4.8% to about 8.9%/wt. of PCPE, and from about 0.2 to about 2.4%/wt. of the rubbery polyepoxide.

The blends of this invention are most easily prepared by mechanical mixing at temperatures between about 375° and about 440° F. under fairly high rates of shear. When such mixing is carried out on a two-roll differential plastics mill, the mixing is preferably caried out at temperatures between about 385° and about 420° F. When the materials of the blend are powder-mixed and fed to an injection molding machine the actual metal surface temperatures in some portions of the machine may be higher than 440° F. although the contact time is much lower than in other mixing equipment. The temperatures of processing recited are the temperatures of the metal surfaces of the mixing apparatus in actual contact with the plastic, as is the usual practice. The temperature of the plastic material usually is somewhat higher than those recited due to frictional heat build-up.

The blend will not develop optimum properties unless the material is fully fused under high shear. The actual amount of mechanical work and rates of shear required are difficult to specify accurately. However, mixing equivalent to that obtained on a two-roll differential plastics mill having four-inch oil-heated rolls maintained between about 385° and 420° F. with fairly close mill spacing will usually provide a well-fused and intimately dispersed blend of optimized properties when milled for about 4 to 8 minutes after a band of stock adherent to the back roll is obtained.

The blends of this invention demonstrate a remarkable resistance to break down under high shear. The impact resistance of these blends show little reduction even after milling for as much as 20 minutes at 410° F. As such, these blends can be said to have broad processing latitude.

The invention will now be described with reference to a number of specific examples which are intended as being illustrative only and not as limiting the invention.

EXAMPLE I

Preparation of poly-n-butene oxide.—A catalyst solution is prepared by adding 33.65 grams (41 ml.) of triethyl aluminum to 200 ml. (171.75 grams) of dry toluene contained in a nitrogen-filled glass container fitted with an agitator. The toluene employed is pre-dried by flowing through 3 A. molecular sieves. The mixing container is oven-dried before use at 100° C. and then purged of oxygen by a flow of dry nitrogen. Without breaking the seal and with the agitator in operation, there is slowly injected 179 ml. (127.61 grams) of diethyl ether while maintaining the liquid temperature at about 25° C. For brevity, the resulting solution is referred to as "Solution A".

A solution, referred to hereafter as "Solution B" is separately prepared by combining in a sealed, agitated container 3.0 ml. (3.02 grams) of water, 147.8 ml. (129.53 grams) of tetrahydrofuran, The container of "Solution A" is then cooled to 0° C. or below and 151 ml. (135.23 grams) of "Solution B" are added slowly with agitation over a 45 minute period so as to insure that the reaction mixture does not go above about 0° C. After one hour 17 ml. of acetyl acetone are added. This resulting mixed solution (clear, light yellow color) is then stirred for about 1 hour at 0° C. while periodically relieving the pressure. The resulting solution is allowed to stand at room temperature overnight before use. Upon analysis, this solution is found to contain about 15.1 mg. of aluminum per ml. or 18.15 mg. of aluminum per gram of solution. Stated another way, the solution is 0.559 molar in aluminum.

The above-described catalyst solution is employed in the preparation of the homopolymers of prophylene oxide and butene-1 oxide. The polymerization in each case is carried out in sealed glass beverage bottles of 250 ml. total volume rotating end-over-end in a 30° C. water bath. Before use in polymerization each such bottle is dried in an oven at 100° C. and purged with dry, oxygen-free nitrogen to expel oxygen and is sealed with a crown cap seal containing a rubber insert permitting hypodermic injection of catalyst and withdrawal of samples. Into each such container there is charged about 200 ml. of sieve-dried (3 A. sieves) toluene, about 2 moles of the particular monomeric epoxide, and an accurately measured 10 ml. of the catalyst solution described above, the latter having been added by means of a calibrated hypodermic syringe. The data below lists the actual weight of monomers, the grams polymer formed and percent conversion at various intervals determined on samples withdrawn, at the time indicated, by a hypodermic syringe, and the final amount of solid polymer isolated (less weight of samples). The bottles are rotated in the water bath for a total of 27 hours after which they are removed from the bath and about 15 ml. of a shortstop solution consisting of 1%/wt. solution of "Ionol" (a non-staining, non-discoloring rubber antioxidant made by Shell Chemical Corp., and said to be a tri-substituted phenol of molecular weight 220.34, M.P. 70° C. and sp. gr. 1.048 gms./cc. at 25° C.) in methanol. The methanol destroys the catalyst and the antioxidant is intended to stabilize the polymer during subsequent work-up and use. The container is tumbled to disperse the antioxidant solution. The short-stopped material is then introduced into vigorously agitated quantity of 50/50 aqueous methanol thereby precipitating the polymer. The precipitate is washed a number of times in 500 ml. portions of the aqueous methanol with very vigorous shear-type of mixing until free of toluene. The precipitate is then dried in a vacuum at 50° C. for one-half hour. The resulting product in each case is a light-colored, tough and rubbery crumb of rather high molecular weight.

The data are as follows:

|  | Grams Polymer and (Percent Conversion) Propylene Oxide | Butene-1 Oxide |
| --- | --- | --- |
| Time, Hrs.: |  |  |
| 0.5 | 4.3 grams (14.3%) | 4.99 grams (13.85%). |
| 1.0 | 5.65 grams (19.5%) | 7.20 grams. |
| 1.5 | 6.95 grams (24%) | 8.47 grams (23.5%). |
| 2.5 | 8.85 grams (30.5%) | 10.51 grams (29.2%). |
| 3.0 | 9.33 grams (32.2%) | 10.8 grams (30%). |
| 4.0 | 10.80 grams (37.2%) | 12.29 grams (34.1%). |
| 6.0 | 11.87 grams (40.9%) | 14.24 grams (39.4%). |
| 21.1 | Too viscous to sample | 14.24 grams (39.4%). |
| 27.0 (Final) | Not determined | 24.8 grams. |
| DSV [1] | do | 14.5 grams. |

[1] DSV = dilute solution viscosity in dl./gm. as determined employing 0.1 gram of polymer in 100 ml. of toluene at 25° C.

Preparation of blend.—Each of the branched-chain polymerized epoxides prepared as above is employed in a blend with a commercially-produced postchlorinated polyvinyl chloride having a density of 1.56 grams/cc. @ 25° C. and a chlorine content of about 65.7%/wt. Such a PCPVC material is produced by the chlorination by the method described above of a commercially-available, high-quality, easy-processing (porous) grade of polyvinyl chloride having an inherent viscosity of 0.94 dl./gram (deciliters/gram) as determined according to ASTM D–1243 employing 0.2 gram of resin dissolved in 100 ml. of cyclohexanone at 30° C.

There is first prepared a powder blended masterbatch of all ingredients except the PCPE and polyepoxide ingredients according to the following recipe:

Material: Parts/Wt.
PCPVC (described above) _____ 100
Tin dithioglycollate [1] _____ 2.5
TO[2] (rutile) _____ 5.0
Lubricant [2] _____ 1.0

[1] Stabilizer.
[2] Low molecular weight polyethylene, "Ac 6294" made by Allied Chemical Corp.

The above materials are mixed for four minutes at 2600 r.p.m. in a Henschel mixer with a final mixing temperature of 149°–150° F.

The required amount of the above masterbatch are milled on a two-roll differential plastic having 4-inch oil-heated rolls maintained at 400° F. The stock is mixed for several minutes until the stock forms a smooth sheet or band adherent to the back roll. At this point 8.75 parts/wt. of PCPE and the desired amount of polyepoxide are added and mixing is continued until band formation again occurs. Measured from the latter time, the stock is then given an additional four minutes of mixing while periodically cutting the stock back and forth on the rolls according to a standard procedure. The material is then sheeted off and allowed to cool to room temperature. Similar blends of (1) without polyepoxide (control) and (2) with a linear, crystalline polymerized tetrahydrofuran (1.0 part) are included for purposes of comparison.

Each batch of blend thus prepared is compression molded in a standard ASTM tensile sheet mold under 40,000 pounds ram pressure. The molding cycle is four minutes preheat and three minutes compression molding at 400° F. after which the mold is transferred to cooling press and allowed to cool under pressure to room temperature. The resulting smooth-finished sheets are tested by the following standard procedures:

Notched Izod impact—four samples each blend, according to ASTM D–256–56, Method A.
Heat deformation temperature—HDT, according to ASTM D–648–56 at 264 p.s.i.
Tensile strength—Instron tester, according to ASTM D–412.
Flow rate—proprietary test employing a Constant Load Extrusion Rheometer operated at 200° C., 400 lbs. force, 5 minutes preheat, No. 10 die orifice (diameter 0.0459 inch and orifice length 0.3260 inch). Standard 4 gram sample.

The data are as follows:

| Blend | Notched Izod, ft.lbs./in. | Melt Flow Rate, gms./min. |
|---|---|---|
| Control Blend A, PCPVC/PCPE, no polyepoxide | 2.76 | 8.10 |
| Control A plus 1.0 gram of PTHF [1] | 1.02 | 5.07 |
| Control Blend B, PCPVC/PCPE, no polyepoxide | 3.89 | 5.54 |
| Control Blend B plus 1.0 gram of PBO [2] | 7.55 | 11.40 |

[1] A linear, crystalline poly-tetrahydrofuran.
[2] A rubbery, amorphous poly-butene-1 oxide, prepared as above.

Whereas the addition of the crystalline PTHF appears to decrease both the impact strength and the melt flow rate, the addition of the rubbery, amorphous poly-alkylene oxide of this invnteion quite strongly improves both of these values. By contrast, note below the comparison of these same two materials when utilized at a much higher ratio of 8.75 parts/wt. per 100 parts/wt. of PCPVC.

| | Notched Izod, ft.lbs./in. | Melt Flow Rate, gms./min. |
|---|---|---|
| Control C, PCPVC/PCPE, no polyepoxide | 2.26 | 6.33 |
| Masterbatch plus 8.75 grams PTHF [1] (no PCPE) | 8.39 | 7.47 |
| Masterbatch plus 8.75 grams PBO [1] (No PCPE) | 0.97 | 45.2 |

[1] A linear, crystalline poly-tetrahydrofuran.

At the above higher levels, the crystalline PTHF imparts excellent impact resistance and improved melt flow rate and in an excellent replacement for the PCPE ingredient in the blend while the higher proportion of the amorphous poly-butene-1 oxide seriously impairs the impact resistance and imparts such a very high melt flow rate as to lead to a serious loss of rigidity in the blend.

Thus, the use of a small proportion of a branched-chain, amorphous polyether greatly improves the blend whereas use of a higher proportion seriously impairs rigidity. The crystalline, polymerized tetrahydrofuran, on the other hand, may be actually deleterious at low levels as a complete replacement for the PCPE ingredient.

EXAMPLE II

The branched-chain, amorphous polymerized butene-1 oxide (above) is employed at several levels in 3-component blends (PCPVC/PCPE/polyepoxide) otherwise the same as in Example I. The data are as follows:

| | | | | | |
|---|---|---|---|---|---|
| PCPVC (Same as Ex. 1) parts/wt. | 100 | 100 | 100 | 100 | 100 |
| PCPE (Same as Ex. 1) parts/wt. | 8.75 | 8.75 | 8.75 | 8.75 | 8.75 |
| Parts/wt. poly-butene-1-oxide/ 100 parts/wt. PCPVC | 0 | 0.25 | 0.5 | 1.0 | 2.0 |
| Melt flow rate g./min. | 6.5 | 7.1 | 11.3 | 10.9 | 18.5 |
| Izod (ft. lbs./in.) | 3.9 | 4.2 | 5.8 | 7.8 | 9.1 |
| HDT, ° C. | 104.5 | 103.0 | 101.5 | 104.5 | 103.0 |
| Tensile (p.s.i.) | 7,680 | 7,380 | 7,467 | 7,347 | 7,215 |

Thus, the impact strength is approaching a maxima in the 1.0–2.0% range and at the 2%/wt. concentration a significant increase in melt flow rate is observed. Over the 0.25 to 2%/wt. range the PBO additive has relatively little effect on HDT and only a minor effect on tensile strength.

EXAMPLE III

In this example, the polypropylene oxide prepared in Example I is compared to a polyethylene oxide prepared by a similar process. Each blend, including controls A and B contain 100 parts/wt. of PCPVC and 8.75 parts/wt. of PCPE (both same as Example I). The procedure is as described in the preceding examples. The data are as follows:

TABLE IV

| | Izod, ft.lbs./in. | Melt Flow Rate, gms./min. | HDT, ° C. |
|---|---|---|---|
| Control A | 4.64 | 5.66 | 101.0 |
| Control A plus 1 part/wt. of polypropylene oxide | 8.81 | 13.69 | 104.5 |
| Control B | 4.31 | 6.00 | 103.0 |
| Control B plus 1 part/wt. of polyethylene oxide | 7.94 | 8.84 | 97.0 |

The above data clearly shows that the linear polyethylene oxide is highly deleterious to the heat distortion characteristics. The polypropylene oxide, on the other hand, very substantially improved all properties of the blend, in particular the HDT and melt flow rate.

EXAMPLE IV

Blends similar to those of Examples I and II (100 PCPVC/8.75 PCPE/1.0 PBO) are tested in this example for their stability (1) to long-continued, high-temperature mill mixing at 370°, 385°, 400° and 410° F. The effect of the mill-mixing test is evaluated by measuring the Izod impact strength of each blend and, in a second similar series by measuring the melt flow rate ("MFG"). The data are as follows:

TABLE V

| No Polyepoxide—Milling Time, Minutes | Mill Mixing Temperature Izod, ft.lbs./in. | | | |
|---|---|---|---|---|
| | 370° F. | 385° F. | 400° F. | 410° F. |
| 4 | 8.61 | 6.02 | (²) | 2.98 |
| 8 | 7.63 | 4.86 | | 4.15 |
| 14 | 6.02 | 3.27 | | 5.98 |
| 20 | 5.75 | 3.77 | | 2.77 |
| 1 Part/wt. PBO | | | | |
| 4 | (¹) | 7.00 | 7.44 | 7.71 |
| 8 | | 7.20 | 8.24 | 7.57 |
| 14 | | 6.54 | 7.31 | 7.27 |
| 20 | | 7.62 | 7.93 | 6.65 |

¹ Not determined, mill temp. too low.
² Not determined.

The above data clearly demonstrates that the branched-chain, amorphous PBO exerts a definite stabilizing influence on the ability of the blend to retain its impact strength under high shear, high temperature mixing. Such blends have very much wider processing latitude than those not containing the PBO.

TABLE VI

| | Milling Time, min. | MFR, Mill Temp. [gms./min.] | |
|---|---|---|---|
| | | 385° F. | 410° F. |
| Control (no polyepoxide) | 4 | 4.36 | 3.85 |
| | 8 | 4.13 | 4.22 |
| | 14 | 3.61 | 3.55 |
| | 20 | 3.11 | 3.40 |
| Control + 1 part/wt. PBO | 4 | 11.8 | ¹13.0 |
| | 8 | 11.2 | ¹16.7 |
| | 14 | 11.2 | ¹15.6 |
| | 20 | 12.1 | ¹13.4 |

¹ 400° F.

The above data indicates that the improved flow rates obtained by use of the poly-butene-1 oxide ("PBO") are essentially completely retained even after extended milling for as much as 20 minutes at 400° F. Without the PBO additive, the control blend with no polyepoxide shows considerable toughening (i.e. reduced "MFR") when subjected to a mild milling cycle of 14 minutes at 385° F.

EXAMPLE V

In this example, the proportion of PCPE is reduced somewhat over the 8.75 parts/wt. proportion employed in the preceding examples. At each level, both a control blend (no PBO) and a similar experimental blend containing 1 part/wt. of poly-butene-1 oxide (PBO) are prepared for the purposes of comparison. All the blends and the PBO are as prepared in Example I.

The data are as follows:

| | Parts/wt Additive PCPE | PBO | Izod impact, ft. lbs./in. | HDT, °C. | Melt flow, rate, gm./in. |
|---|---|---|---|---|---|
| (1) Standard Recipe (Ex. I) | 8.75 | 0 | 2.97 | 100.0 | 7.8 |
| (2) Standard Recipe (Ex. I) | 8.75 | 1 | 7.55 | 103.5 | 11.4 |
| (3) Standard Recipe (Ex. I) | 7.75 | 0 | 1.77 | 104.5 | 7.2 |
| (4) Standard Recipe (Ex. I) | 7.75 | 1 | 4.64 | 103.5 | 14.3 |
| (5) Standard Recipe (Ex. I) | 5.00 | 0 | (¹) | (¹) | (¹) |
| (6) Standard Recipe (Ex. I) | 5.00 | 1 | 1.80 | 104.0 | 8.4 |

¹ Does not band.

The effect of a small proportion of the poly-butene-1 oxide appears to be somewhat more pronounced at the lower PCPE limits and there is some evidence that melt flow rate and HDT are approaching a maxima at the 7.75 parts/wt. level of PCPE. Note that the addition of 1 part/wt. of poly-butene-1 oxide imparts to a difficulty-processable composition (5.00 parts/wt. of PCPE) relatively good processability with a melt flow rate higher (8.35 gms./min.) then blend No. 1 (7.8 gms./min.) containing the standard 8.75 parts/wt. of PCPE.

EXAMPLE VI

In this example, two polymeric epoxides prepared from monomers of radically-different structure are compared in blends of this invention. One such polymeric epoxide is prepared from hexene-1 oxide and the other from phenyl glycidyl ether. These polymers, prepared by procedures similar to that of Example I, are of appreciable molecular weight (i.e. DSV above 3). The poly-hexene-1 oxide is amorphous and rubbery whereas the polymerized epoxy phenyl glycidyl ether is a harder, resinous material somewhat resembling a styrene polymer in appearance. The blends of polyvinyl chloride (masterbatch form), PCPE, and polyepoxide are prepared and tested for notched Izod, melt flow rate and HDT as in the previous examples.

The data are as follows:

| Sample No. | Weight-Grams | | | Izod, lbs./in. | MFR, gms. | HDT, °C, |
|---|---|---|---|---|---|---|
| | Master batch | PCPE | Epoxide | | | |
| 919A | 92.8 | 7.48 | 0.86 (PPGO)¹ | 3.9 | 7.4 | 100.5 |
| 919B | 92.8 | 7.48 | 0.86 (PHO)² | 8.8 | 12.9 | 105.0 |
| 919C (Control) | 92.8 | 7.48 | | 3.9 | 7.4 | 101.0 |

¹ Poly-phenyl-glycidyl ether.
² Poly-hexene-1 oxide.

These data again demonstrate the relatively great effect of a small proportion of a rubbery, amorphous polyalkylene oxide in the blends of this invention as contrasted with that of a non-rubbery resinous or crystalline polyepoxide.

We claim:

1. A resinous blend having high impact resistance and good heat distortion and melt flow characteristics and comprising a fused mixture of, as polymeric constituents, (1) 100 parts/wt. of a postchlorinated vinyl chloride resin, (2) from about 5 to about 10 parts/wt. of a rubbery postchlorinated linear polyethylene, and (3) from about 0.25 to about 2.5 parts/wt. of a rubbery, amorphous polyepoxide, said postchlorinated vinyl chloride resin having a specific gravity at 23° C. according to test method ASTM D-792 of from about 1.52 to about 1.62 grams/cc. and a heat distortion temperature according to test method ASTM D-648 at 264 p.s.i. at least 20° C. higher than that of its parent vinyl chloride resin, said parent vinyl chloride resin being a polymer produced by the polymerization of a mixture of mono-vinylidene monomers containing at least 95%/wt. of vinyl chloride, said postchlorinated polyethylene containing from about 5% to about 50%/wt. of chlorine and being produced by the homogenous chlorination of a linear polyethylene having a melt index value above about 0.05, and said polyepoxide being a material having a dilute solution viscosity of at least 3.0 dl./gram as determined employing a concentration of 0.1 gram in 100 ml. of toluene at 25° C. and produced by the polymerization of an alkylene monooxide in which the epoxy group is attached to a hydrocarbon group containing at least three consecutively-connected carbon atoms.

2. The blend as defined in claim 1 and further characterized by said postchlorinated vinyl resin being a postchlorinated polyvinyl chloride.

3. The blend as defined in claim 1 and further characterized by said postchlorinated vinyl resin being a postchlorinated polyvinyl chloride and by said polyepoxide being produced by the polymerization of an alkylene monooxide of the formula

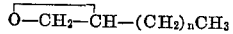

wherein $n$ is an integer from 1 to 6.

4. The blend as defined in claim 1 and further characterized by said postchlorinated vinyl chloride resin being a postchlorinated polyvinyl chloride, by said postchlorinated polyethylene containing from about 30% to about 40%/wt. of combined chlorine, and by said polyepoxide being poly-butene-1 oxide.

5. The blend as defined in claim 1 and further characterized by said postchlorinated vinyl chloride resin being a postchlorinated polyvinyl chloride, by said postchlorinated polyethylene containing from about 30% to about 40%/wt. of chlorine and being present in a proportion of from about 6 to about 9 parts/wt., and by said polyepoxide being a polypropylene oxide.

6. The blend as defined in claim 1 and further characterized by said postchlorinated vinyl chloride resin being a postchlorinated polyvinyl chloride, by said postchlorinated polyethylene containing from about 30% to about 40%/wt. of combined chlorine, and by said polyepoxide being poly-hexene-1 oxide.

References Cited

UNITED STATES PATENTS

| 3,299,182 | 1/1967 | Jennings et al. | 260—897 |
| 2,718,509 | 9/1955 | Lundsted et al. | 260—33.2 |

MURRAY TILLMAN, *Primary Examiner.*

C. J. SECCURO, *Assistant Examiner.*

U.S. Cl. X.R.

260—2

UNITED STATES PATENT OFFICE
CERTIFICATE OF CORRECTION

Patent No. 3,453,347                                    July 1, 1969

Patricia M. Dreyfuss et al.

It is certified that error appears in the above identified patent and that said Letters Patent are hereby corrected as shown below:

Column 2, line 67, "propertions" should read -- proportions --. Column 3, line 75, "survice" should read -- survive --. Column 6, line 16, "other" should read -- others --. Column 7, line 26, "caried" should read -- carried --. Column 8, line 25, "(3 A." should read -- (3-A. --. Column 9, line 12, in the table, "$TO^2$" should read -- $TiO_2$ --. column 9, first footnote "2" "6294" should read -- 629A --; column 9, second footnote "2" "preapred" should read -- prepared --. Column 12, line 7, "then" should read -- than --.

Signed and sealed this 24th day of March 1970.

(SEAL)
Attest:

EDWARD M. FLETCHER, JR.                    WILLIAM E. SCHUYLER, JR.
Attesting Officer                             Commissioner of Patents